United States Patent [19]
Domberg et al.

[11] Patent Number: 5,289,441
[45] Date of Patent: Feb. 22, 1994

[54] RECORD PLAYING DEVICE HAVING MULTIPLE RECORDS BEING PLAYED CONTINUOUSLY

[75] Inventors: Hans Domberg, Hullhorst; Georg Seidel, Minden, both of Fed. Rep. of Germany

[73] Assignee: Deutsche Wurlitzer GmbH, Stemwede, Fed. Rep. of Germany

[21] Appl. No.: 836,099

[22] Filed: Feb. 14, 1992

[30] Foreign Application Priority Data

Feb. 19, 1991 [DE] Fed. Rep. of Germany ....... 4105016

[51] Int. Cl.⁵ .................. G11B 17/22; G11B 17/08
[52] U.S. Cl. .................................. 369/34; 369/191; 360/98.06
[58] Field of Search ............. 369/34, 36, 191, 195; 360/92, 98.05, 98.06

[56] References Cited

U.S. PATENT DOCUMENTS

| | | | |
|---|---|---|---|
| 1,508,572 | 9/1924 | Ord | 369/191 |
| 2,482,659 | 9/1949 | Davis et al. | 369/36 |
| 2,521,046 | 9/1950 | Darwin | 369/34 |
| 2,577,272 | 12/1951 | Sager | 369/34 |
| 2,601,501 | 6/1952 | Cain | 369/191 |
| 5,136,562 | 8/1992 | Staar | 369/36 |

FOREIGN PATENT DOCUMENTS

| | | |
|---|---|---|
| 0138005 | 4/1985 | European Pat. Off. |
| 1017378 | 10/1957 | Fed. Rep. of Germany |
| 60-256969 | 5/1986 | Japan |
| 62-256261 | 4/1988 | Japan |

Primary Examiner—A. J. Heinz
Assistant Examiner—David D. Davis
Attorney, Agent, or Firm—Merchant & Gould Smith, Edell, Welter & Schmidt

[57] ABSTRACT

Described is a record play-back device with two record magazines lying opposite one another, each one for accommodating a stack of records consisting of records lying over one another. A play-back unit is disposed under and between the record magazines, with a transport mechanism that is movable in the direction of the stack of records, the mechanism including, in the transverse direction between the two stacks of records, a mobile transverse sliding carriage that transports a desired record to and from between its place within a record magazine and the play-back unit. Each record magazine displays, in the case of each record, at least one holder element releasably accommodating the record rim, and the transverse sliding carriage includes at least one gripping arrangement that seizes the desired record at the rim of the record, and with movement of the transverse sliding carriage releases it from the holder element of the record magazine.

13 Claims, 6 Drawing Sheets

RECORD PLAYING DEVICE HAVING MULTIPLE RECORDS BEING PLAYED CONTINUOUSLY

BACKGROUND OF THE INVENTION

The invention concerns a record play-back device with two record magazines lying opposite one another, each one for accommodating a stack of records consisting of records lying over one another, with a play-back unit that is disposed between the record magazines, under the lowermost records, having a transport mechanism capable of moving in the direction of the stack of records, said mechanism including, in the transverse direction between the two stacks of records, a mobile transverse sliding carriage that transports a desired record to and fro between its place within a record magazine and the play-back unit.

Known from EP 0,138,005 is a record play-back device of this type in which the records are held in individual record holders, with the record supports being stacked over one another in the record magazines. Since, in each case, the records are transported together with their record holders between their position in the record magazine and the play-back unit, the transverse sliding carriages must, in each case, remove the record holder together with the inserted record from the magazine, respectively guide it back into the magazine. Since the record holders overlap the records at the rim, and therewith display a greater space requirement than the record itself, for compensation of this increased space requirement, the sliding carriage and the gripping mechanism for picking up the record holder is constructed in an especially space-saving manner. In particular, the space-saving gripping mechanism located on the transverse sliding carriage is expensive, it requires special record holders that contain their own detent mechanism for cooperating with the gripping mechanism.

Likewise known from DE-OS 3,922,721 is a record play-back device wherein the records are stored and transported in individual record holders. To simplify the transport process of the unit formed of record holder and record, provided in each case with this known type of record play-back device are two independently-controllable sliding carriages on the transport mechanism, with the first sliding carriage—also called pull-out mechanism—executing transport between the first record magazine and the play-back device, and the second transverse sliding carriage/pull-out mechanism executing transport of the record holder between the second record magazine and the play-back unit.

SUMMARY OF THE INVENTION

The object of the invention is to further develop the record play-back device of the initially-mentioned species, such that a reliable transport of the records between record magazine and play-back unit is possible, with a compact and simple construction of the entire device.

In the case of the record play-back device of the initially mentioned species, this objective is met in accordance with the invention by the fact that each record magazine displays, for each record, at least one holding element releaseably accommodating one record rim, and that the transverse sliding carriage contains at least one gripping arrangement that grips the desired record at the rim of the record and, with movement of the transverse sliding carriage, releases it from the holding element of the record magazine.

The advantages of the invention lie particularly in the fact that the records are directly held in removable fashion in the record magazines, i.e. without a record holder, and that the transverse sliding carriage directly grips the record at the rim of the record by means of a gripping arrangement, and holds it firmly during transport. Record holders for the individual records, in particular auxiliary record holders with special locking means, pawls, or the like can be eliminated. Also dropping out in this way is the greater space requirement that is needed by using the record holders.

Advantageously, arranged on the transverse sliding carriage is a first gripping arrangement directed toward the first record magazine and a second gripping arrangement directed toward the second record magazine. In the event that the transverse sliding carriage is to remove a desired record from the first record magazine, then the transverse sliding carriage is moved toward the first record magazine, the first gripping arrangement is then activated and then, with clamping pressure, removes the desired record, which is then transported together with the transverse sliding carriage to the play-back unit, etc. If, on the other hand, a record is to be taken out from the second record magazine, then the transverse sliding carriage will move toward the second record magazine, until the rim of the desired record extends between the second gripping arrangement. Next, the second gripping arrangement is closed, the selected record is then firmly clamped in the gripping-jaw pair of this gripping arrangement and can be moved horizontally together with the transverse sliding carriage, and next vertically to the play-back unit. By means of this arrangement of two gripping arrangements directed toward each record magazine, the space requirement that the transverse sliding carriage needs in the horizontal direction is reduced.

In particularly preferred manner, the gripping arrangements—as seen in the vertical direction—have a form that corresponds to a predetermined section of periphery of the record rim of the record contained in the record magazine. By means of this measure, it is possible to further reduce the space requirement for the transverse sliding carriage, while, simultaneously, the gripping arrangements, because of their form-fitting to the rim of the record, press against the rim of the record with adequately-low contacting pressure, and thereby can exert the required clamping forces.

Preferably, arranged offset at the periphery of the records, per record in the record magazines, are at least two holder elements that include springs acting against the rim of the records, which exert radial and/or axial clamping forces on the rim of the record, positively pressing the record into the slotted guide rails of the record magazine, which, however, permit removal of the record by means of the transverse sliding carriage when the gripping arrangements of the transverse sliding carriage seize and hold a record at the rim of the record.

Preferably, the transport mechanism includes a vertical column along which can be moved—driven by a first motor—a main sliding carriage. The principal sliding carriage includes a horizontal, transverse guide along which the transverse sliding carriage—driven by a second drive motor—can be moved. At some distance from the transport column, it is possible to arrange another transport column on which the main sliding carriage is guided by means of a friction (sleeve) bearing, in order to enable a precise vertical travel of the main (principal) sliding carriage.

The gripping arrangements are constructed as gripping-jaw pairs that are closable toward one another by means of a detent magnet or a small motor, and can firmly clamp, with sufficient clamping forces, the record rim of the record to be transported.

Preferably, the transverse sliding carriage is controllable in a first and/or a second removal position, in which the gripping jaws can firmly hold the rim of a record from the first and/or from the second record magazine. In connection with a removal process, the transverse sliding carriage can be controlled in a first and/or a second transport position in which the record taken from the first and/or the second stack of records finds itself centrically over the record table of the play-back unit, so that the principal sliding carriage of the transport mechanism can then be lowered along the transport column.

In particularly preferred fashion, the record magazines are, for example, capable of being removed from the record play-back device in pivotable and/or releasable fashion about a pivoting axis running in the direction of the stack of records, in order to be more easily accessible for refilling.

According to a particularly preferred form of embodiment of the invention, instead of one play-back unit, two play-back units are arranged below the record magazines, with each play-back unit displaying its own drive, and being movable in horizontally-traveling or pivoting fashion, or in some other way, from the center position, which lies between the record magazines, into a working position at some distance from the center position. For depositing and lifting off the records, one of the play-back units is moved by the appropriate drive into the middle position, which is served by the vertically-traveling transport mechanism for changing a record. Next, the play-back unit in question, with the deposited record, is moved out from the center position into a working position, in which is pivotably arranged a pressure arm that can be pivoted against the record plate of the play-back unit for playing back. While the first play-back unit is in the play-back position, therefore while a record of this play-back unit is being played back, the second play-back unit can be brought into the center position and be loaded with a record. Next, the second play-back unit is moved into its working position, play back of the second record can then begin immediately after play back of the first record. The depositing of records and/or the return of the records into the record magazines hence follows, in accordance with the invention, during the playing back of a record. The degree of utilization of the record play-back device is essentially improved by this.

Particularly preferred, the two play-back units are guided on guide rods and allow themselves to travel strongly toward the direction of the stacks of records, e.g. by means of a cogged belt. Preferably, each play-back unit is provided with its own drive in order to be able to control the movement of the play-back units easily and clearly.

Advantageous further developments of the invention are characterized by the features of the subclaims.

BRIEF DESCRIPTION OF THE DRAWINGS

Explained in more detail in the following with the aid of the drawing is an example of embodiment of the invention.

DESCRIPTION OF THE PREFERRED EMBODIMENTS

Figure 1:
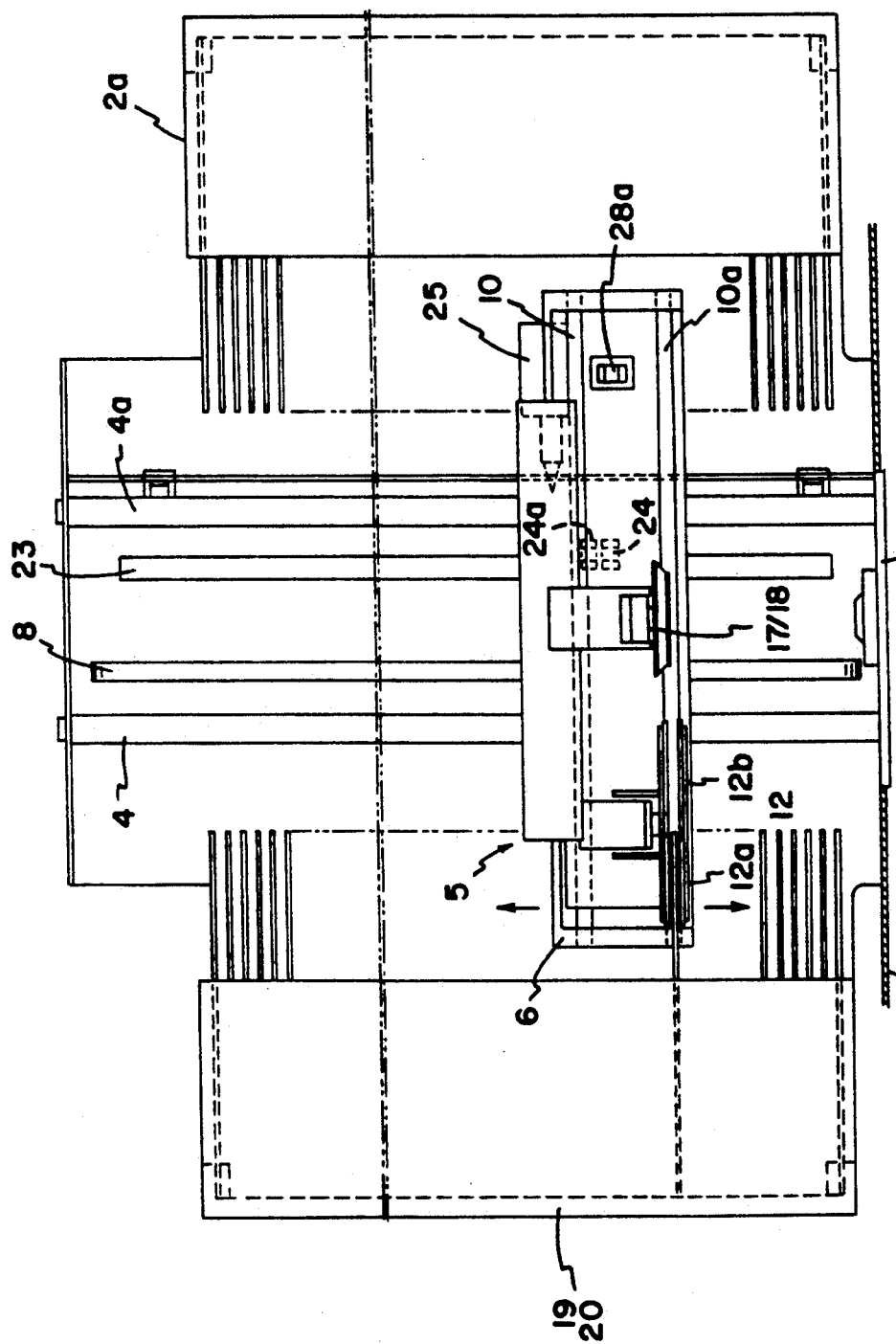
FIG. 1 shows a front view of the record play-back device.
Figure 2:
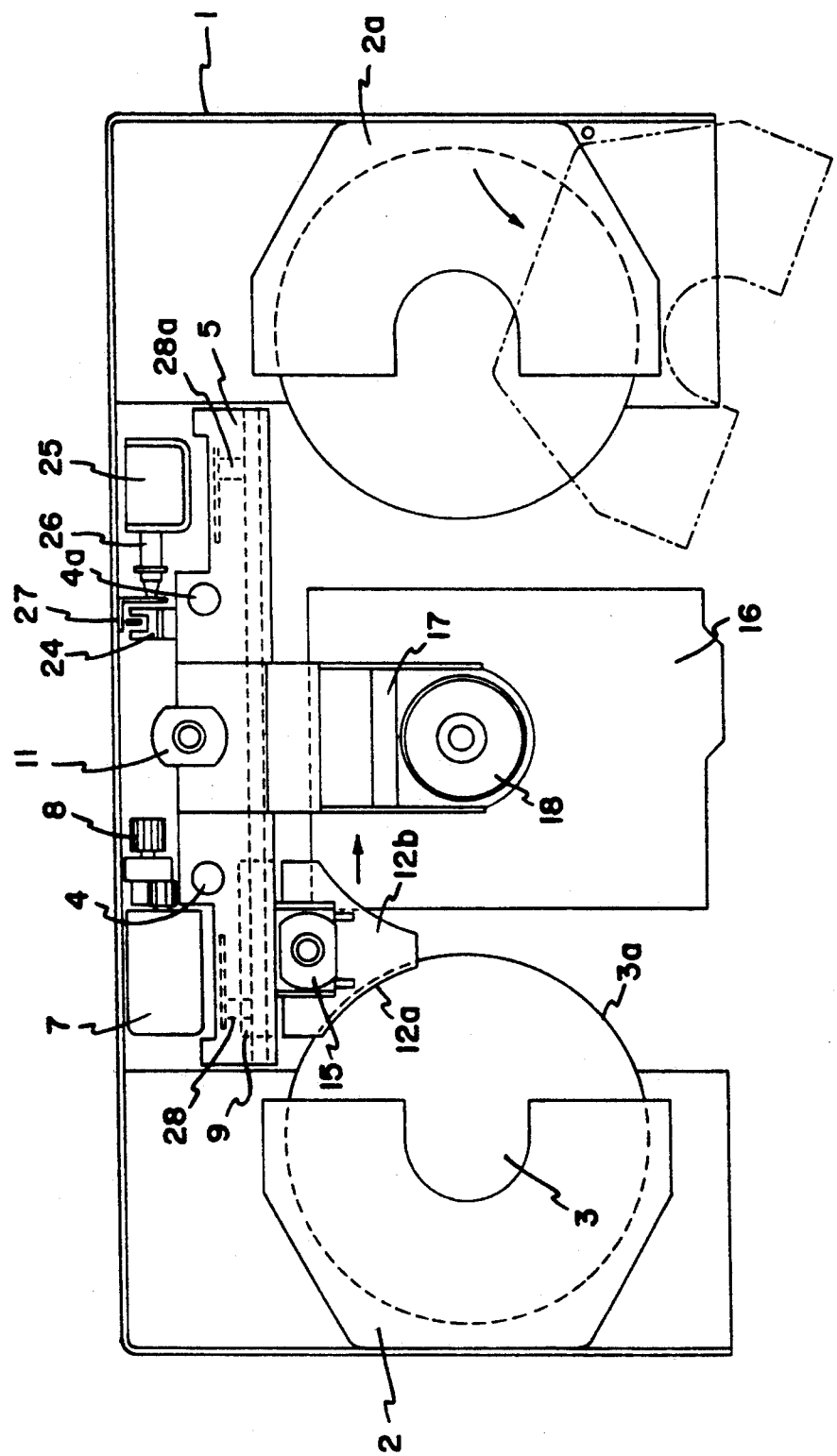
FIG. 2 shows a top view onto the record play-back device in accordance with FIG. 1.
Figure 3:
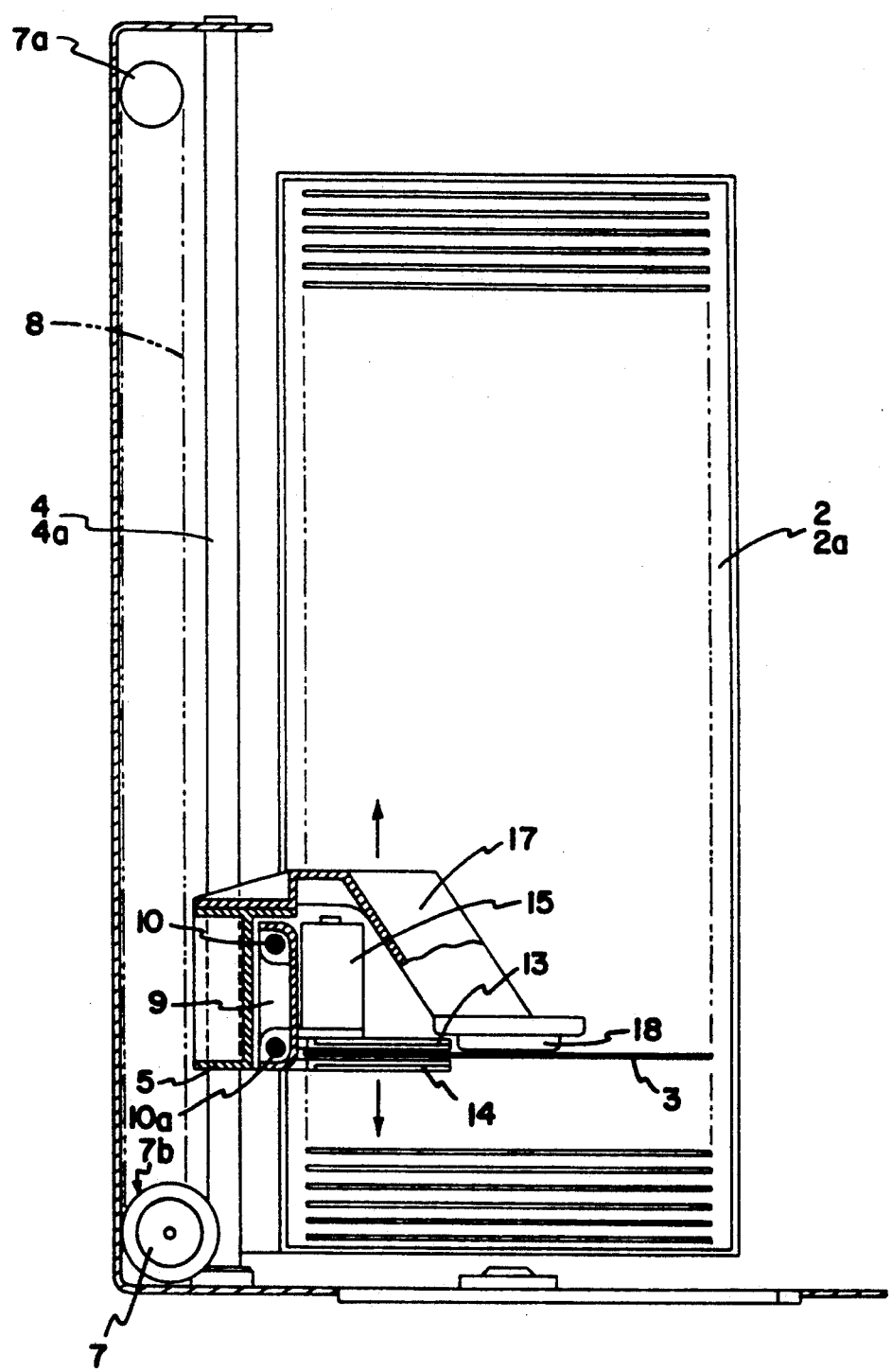
FIG. 3 shows a side view of the record play-back device in accordance with with FIGS. 1 and 2.

FIGS. 1 to 3 show a record play-back unit in a front view, top view and side view. A housing 1 forms a base and part of the back wall of the device and carries two record magazines 2, 2a lying opposite one another, which are arranged pivotably or removably in the housing 1. The record magazines 2, 2a each accommodate a stack of records, each consisting of several records 3 stacked over one another. Below the two record magazines, mounted centrally between the two stacks of records is a play-back unit such that the centerlines of the records 3 located in the record magazines 2, 2a align with the center of the play-back unit; compare in particular FIG. 2.

Provided between the two record magazines 2, 2a is a transport mechanism that is movable on two transport columns 4, 4a running in the direction of the stacks of records. The transport mechanism 5 displays a principal sliding carriage 6 that is journaled displaceably along the transport columns 4, 4a by means of friction (sleeve) bearings. Attached to the principal sliding carriage 6 are two transverse guides 10, 10a, along which is journaled a transverse sliding carriage 9 that is displaceable in the transverse direction. The principal sliding carriage 6 is driven by a principal drive motor 7 via a cogged belt 8 that runs parallel to the transport columns 4, 4a, and that is held taut via a top roller 7a along with a lower one on the motor shaft 7. The transverse sliding carriage 9 has its own geared motor 11 that drives the transverse sliding carriage, e.g. by means of a gear rack/pinion arrangement or a cogged belt.

Fixed on the transverse sliding carriage 9 is a first gripping arrangement 12a, and a second gripping arrangement 12b directed toward the second record magazine 2a.

Figure 4:
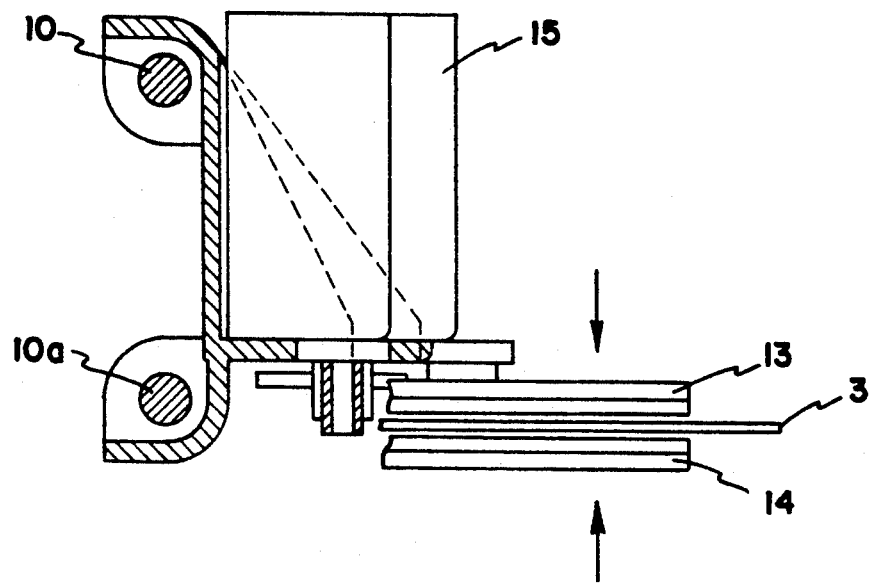
FIG. 4 shows a cross section through a circular arrangement.
Figure 5:
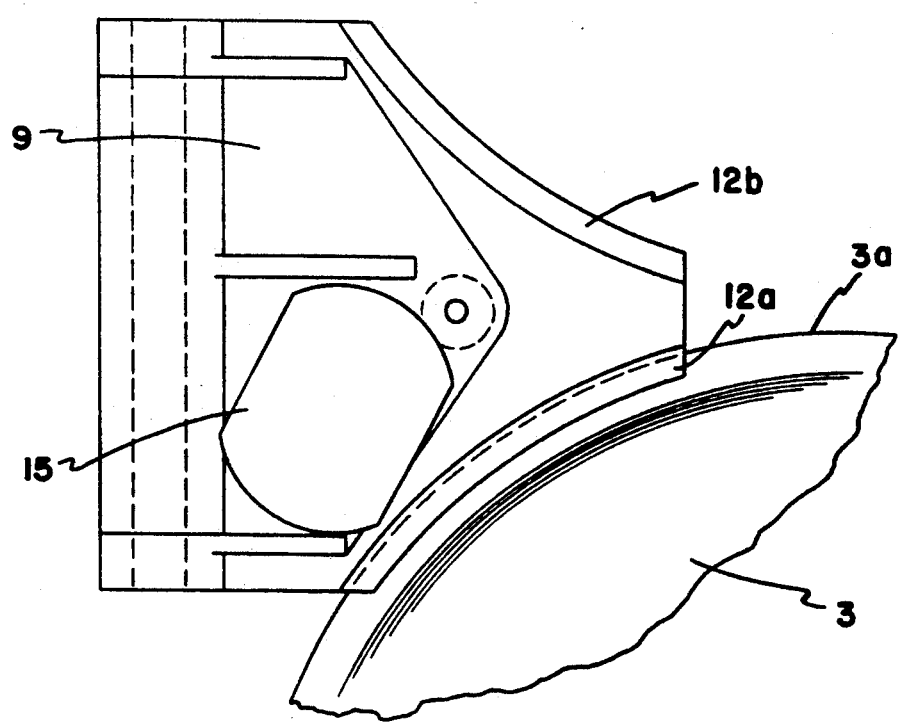
FIG. 5 shows a top view onto the gripping arrangement of FIG. 4.

The gripping arrangements 12a, 12b have—seen in the direction of the stack of records—a form that corresponds to a predetermined section of periphery of the record rim 3a of the records contained in the first, respectively the second record magazine 2, 2a; compare in particular FIG. 3 along with 4 and 5. Each gripping arrangement 12a, 12b includes a top gripping jaw 13 and a lower gripping jaw 14; compare in particular FIG. 4. One or both gripping jaws 13, 14 are swung in pivotable fashion or are movable toward one another, and fixed to the transverse sliding carriage 9 is a grip motor 15 that closes the gripping jaws 13, 14 against one another, and seizes and firmly holds a record 3, projecting between the gripping jaws 13, 14, at its record rim 3a with a predetermined clamping pressure. On the other hand, the grip motor 15 opens the two gripping jaws 13, 14 upon appropriate control command whenever a transported record is to be deposited on the play-back unit 16 or to be placed back into one of the record magazines 2, 2a.

As can in particular be obtained in FIGS. 1 to 3, disposed centrally above the play-back unit 16, on the principal sliding carriage 5, is a pressure arm 17, which, at its free end, carries, aligned with the center of the play-back unit, a contacting-pressure member 18, which, after depositing a record 3 on the play-back unit 16, can be moved slightly downwardly in order to press the record 3 against the play-back unit 16.

Figure 6:
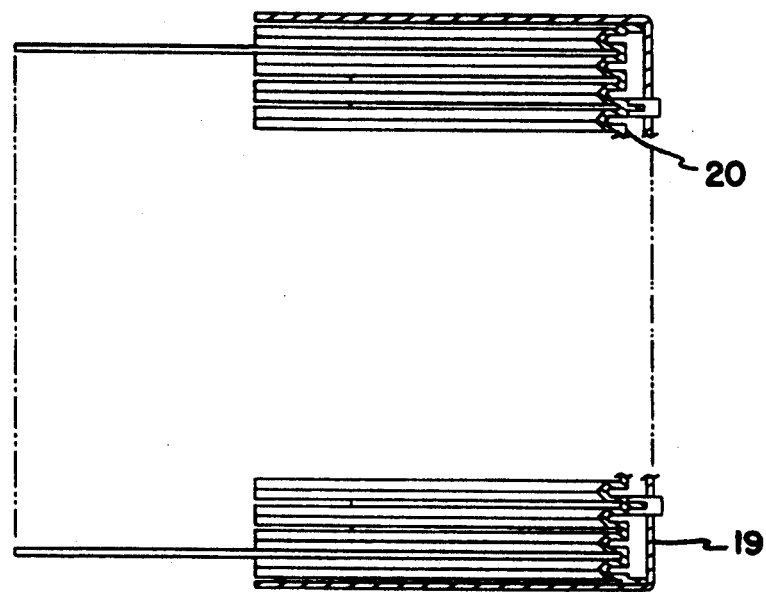
FIG. 6 shows a cross section through a record magazine.
Figure 7:
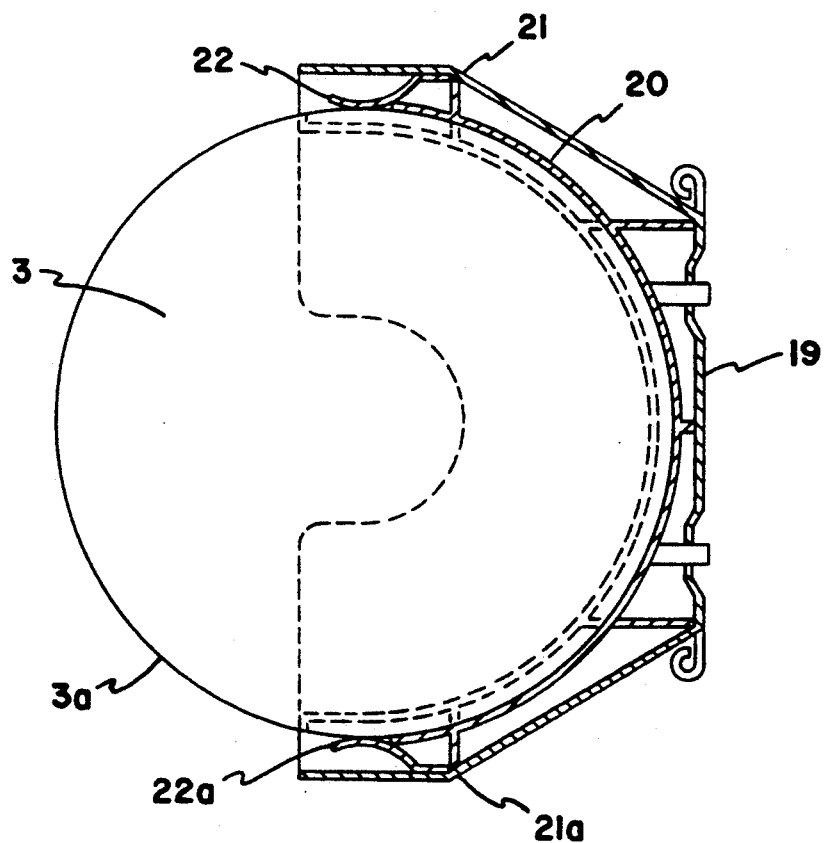
FIG. 7 shows a top view onto the record magazine of FIG. 6.

As can in particular be obtained from FIGS. 1, 3, along with 6 and 7, each record magazine 2, 2a consists of one each carrier 19 running in the direction of the stack of records, on which several slotted guide strips 20 are affixed, which run transversely to the carriers 19 and, in turn, accept the rim 3a of a record 3 with a predetermined clamping pressure. The slotted guide strips 20 run along a predetermined section of periphery at the rims of the records 13a. Further provided fixed to the carriers 19 are support strips 21, 21a that run at a small distance from the record rims 3a, and carry at their free ends spring elements 22, 22a, which lie radially against the associated record rim with a predetermined contacting pressure, in order to prevent the records 3 from slipping out. In the form of embodiment represented (compare FIGS. 3, 6 and 7) the slotted guide strips run about 180° along the record rims 3a, and the spring elements 22, 22a lie on the free ends of the guide strips 20, offset to one another by about 180° at the record rims.

Fixed parallel to the transport columns 4, 4a is an apertured partition 23, which cooperates with a photoelectric circuit 24 fixed on the principal sliding carriage 5 and that emits position signals to a control contrivance. If a desired position signal is recognized by the control contrivance (not represented), then the principal gear motor 6 is switched off and a detent magnet 25 on the principal sliding carriage 5 has its current shut off. The core 26 of the detent magnet 25 then places into a detent position a detent strip 27 that runs parallel to one of the transport columns 4a. Then, in this way, the principal sliding carriage 5 is locked in a desired position defined by an entered selection command. Next, the control contrivance applies voltage to the gear motor 11, so that the transverse sliding carriage 9 is set into movement along the transverse rods 10, 10a, in the direction toward the record 3 that is to be gripped. Reaching of the desired position in which the gripping jaws 13, 14 of the gripping arrangement 12, respectively 12a seize the outer record rim 3a in arcuate fashion is transmitted via a photoelectric circuit 28, respectively 28a, whereupon the gear motor 11 is switched off. Simultaneously, the grip motor 15 is activated, which, thereupon, closes the gripping jaws 13 and 14 and hold the selected record at its rim 3a. Next, the gear motor 11 is again put into operation until the record 3 being held in the gripping arrangement is centrally over the play-back unit 16. The gear motor 11 is then switched off; the principal gear motor 7, on the other hand, is activated, and the principal sliding carriage 5 is driven downwardly until the record 3 lies centrally on the play-back unit 16.

Next, the gripping jaws 13, 14 are opened by the grip motor 15, and the transverse sliding carriage 9 is moved away slightly from the record 3, so that the gripping arrangement releases the record rim 3. Then, the principal sliding carriage 5 is again moved slightly downwardly, so that the pressure arm 17 presses the pressure member 18 downwardly onto the record 3, and presses this latter against the play-back unit 16.

Return transport of a record 3 from the play-back unit 16 into one of the record magazines 2, 2a, is accomplished in corresponding fashion, with only activation of the drives running off in a correspondingly reversed sequence.

Figure 8:
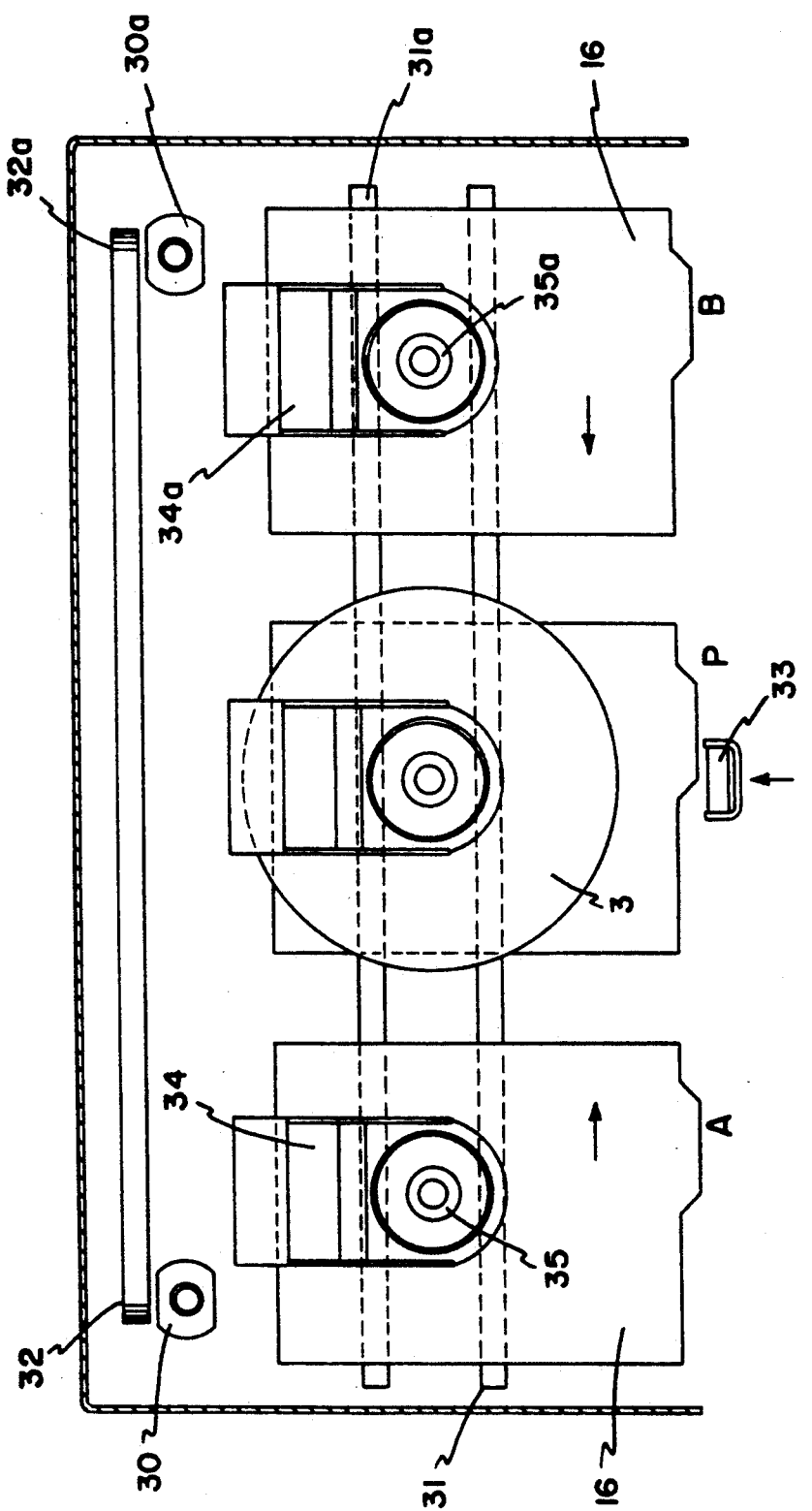
FIG. 8 shows a top view onto the record play-back device with two movable play-back units.

Represented in FIG. 8 is a schematic top view onto another form of embodiment of the record play-back device, which contains two play-back units. Arranged below the two record magazines 2, 2a are transverse-running guide rods 31, 31a, along which the two play-back units 16, 16a are displaceable by means of one each displacement motor 30, 30a, and one each cogged belt 32, 32a. Each one of the playback units 16, 16a can be moved from the middle position P along the guide rods 31, 31a, transversely into a working position A, respectively B that are located under the record magazines 2, 2a.

Alternatively, it is also possible to move the two play-back units 16 by means of other, predetermined-movement sequences, out from the middle position P into working positions A, B, which are adequately spaced from the middle position.

In the case of the form of embodiment of the invention represented in FIG. 8, fixed on each play-back unit 16 is a pressure arm 34, 34a which, after depositing a record, can be pressed against the record and the play-back unit 16.

For depositing and lifting off a record 3, moved into the middle position P, as required, is one of the play-back units 16. Next, fetched from one of the magazines by the transport unit 5 is a record 3, and it is deposited on the centrally-positioned play-back unit 16. Thereupon, the play-back unit 16 is moved out from the middle position P into its working position A, B. In the working position, the pressure member 35 is set in place by means of the pressure arm 34, the record can then be played back.

During the play-back process, the other play-back unit can be moved into the middle position P, in order to transport the deposited record back into one of the magazines 2, 2a by means of the transport unit 5, and to deposit a new record 3 onto this centrally-positioned play-back unit 16. The play-back units 16 are positioned exactly in the middle position by means of a detent magnet 33, and are held in this position.

In the way described, it is possible to assure that, before the end of a piece of music reproduced by a play-back unit 16, the second record has already been placed on the second play-back unit 16, has been brought into working position (operating RPM), and that the reading unit has traveled to the beginning of the selected piece of music. Possible by this means is a smooth-transition reproduction of the music, which is particularly advantageous in discotec operation.

We claim:

1. Record play-back device with two record magazines lying opposite one another, each one for accommodating a stack of records consisting of records lying over one another, with a play-back unit below and between the record magazines, having a transport mechanism capable of moving in a direction of each stack of records, said mechanism including, in the transverse direction between the two stacks of records, a mobile transverse sliding carriage that transports a desired record from a record magazine to the play-back unit and from the play-back unit to the record magazine between a place within the record magazine and the play-back unit, wherein each record magazine (2, 2a) displays for each record (3) at least one holder element (20 to 22a) releasably accommodating an outer rim (3a) of the record, and that the transverse sliding carriage (9) includes at least on gripping arrangement (12a), which seizes the desired record (3) at the record rim (3a) and, with movement of the transverse sliding carriage (9), releases it from the holder element (20 to 22a) of the record magazine (2, 2a), the transverse sliding carriage (9) includes a first gripping arrangement (12a) directed toward the first record magazine (2) and a second gripping arrangement (12b) directed toward the second record magazine (2a), both gripping arrangements (12a, 12b) being fixedly attached adjacent each other at the sliding carriage (9) and being constructed as an upper and a lower gripping jaw (13, 14), said gripping jaws (13, 14) having a periphery, as seen in the vertical direction, that corresponds to a predetermined section of a periphery of the record rim (3a) of the records (3) contained in the first and the second record magazines (2, 2a), respectively.

2. Record play-back device according to claim 1, wherein there are arranged in each record magazine (2, 2a) for each of the records (3), at least two holder elements that are offset to the periphery of the records.

3. Record play-back device according to claim 4, wherein the holder elements (20 to 22a) include springs elements (22, 22a) acting against the record rim (3a).

4. Record play-back device according to claim 3, wherein the holder elements contain slotted guide strips (20) whose slot (20a) accepts, with clamping pressure, the rim of the record.

5. Record play-back device according to claim 4, wherein the transport mechanism includes at least one vertical transport column (4, 4a), along which a principal sliding carriage (6) can be moved, and that the principal sliding carriage (6) carries at least one transverse guide (10, 10a) along which the transverse sliding carriage (9) can be moved in a transverse direction.

6. Record play-back device according to claim 5, wherein arranged at some distance from the vertical transport column (4) is a second vertical transport column (4a) on which the principal sliding carriage is guided by means of a sleeve bearing.

7. Record play-back device according to claim 6, characterized by the fact that the upper and/or lower gripping jaw (13, 14) are hinged, and are movable by means of a detent magnet or grip motor (15) from an open position into a closed position, and exerting a clamping pressure on the rim of the record.

8. Record play-back device according to claim 7, wherein the transverse sliding carriage (9) is controllable in a first and a second removal positions, respectively, in which the gripping arrangement (12a, 12b) seizes a record (3) from the first and the second record magazines (2, 2a), respectively, and that the transverse sliding carriage (9) is controllable into a first and a second transport positions, respectively, in which the record held by the first and the second gripping arrangements (12a, 12b), respectively, is located centrically over the record table of the play-back contrivance (16).

9. Record play-back device according to claim 8, wherein the record magazines (2, 2a) include a carrier (19) that runs, at a predetermined distance from the rim of the record (3), in the direction of the stack of records, on the carrier (19), perpendicularly to the direction of the stack, are slotted guide strips (20) whose slot (20a) holds the rim of the record considered under a clamping pressure, and carries spring elements (22, 22a) acting radially against the record rim.

10. Record play-back device according to claim 9, characterized by the fact that the slotted guide strips (20) grip around about half the periphery of the record, and carry at their free ends the spring elements (22, 22a).

11. Record play-back device according to claim 10, characterized by the fact that the record magazines are removable in pivotable and/or releaseable fashion from the record play-back device about a pivot axis running in the direction of the stack of record.

12. Record play-back device according to claim 3, wherein the spring elements (22, 22a) radically hold against the record rim (3a) with a predetermined contacting pressure in order to prevent the records (3) from slipping out of the holder elements.

13. Record play-back device according to claim 1, wherein the gripping jaws (13, 14) are swung in pivotable fashion, the stacks of the records being reached by a pivoting action of the gripping jaws.

* * * * *